(12) United States Patent
Kojima et al.

(10) Patent No.: US 11,884,558 B2
(45) Date of Patent: Jan. 30, 2024

(54) FLUID DEVICE

(71) Applicant: SEIKO EPSON CORPORATION, Tokyo (JP)

(72) Inventors: Chikara Kojima, Matsumoto (JP); Tomohide Onogi, Shiojiri (JP); Kanechika Kiyose, Matsumoto (JP); Mitsuru Miyasaka, Shiojiri (JP)

(73) Assignee: SEIKO EPSON CORPORATION, Tokyo (JP)

(*) Notice: Subject to any disclaimer, the term of this patent is extended or adjusted under 35 U.S.C. 154(b) by 90 days.

(21) Appl. No.: 17/500,264

(22) Filed: Oct. 13, 2021

(65) Prior Publication Data
US 2022/0112100 A1 Apr. 14, 2022

(30) Foreign Application Priority Data

Oct. 14, 2020 (JP) .................................. 2020-173212

(51) Int. Cl.
*C02F 1/36* (2023.01)
*B01D 21/28* (2006.01)
(Continued)

(52) U.S. Cl.
CPC .............. *C02F 1/36* (2013.01); *B01D 21/283* (2013.01); *C02F 2101/30* (2013.01); *C02F 2103/002* (2013.01)

(58) Field of Classification Search
CPC ...... C02F 1/32; C02F 1/36; C02F 1/46; C02F 1/72; C02F 1/78; B01D 21/00; B01L 3/00; A61M 1/36
See application file for complete search history.

(56) References Cited

U.S. PATENT DOCUMENTS 7,081,192 B1 7/2006 Wang et al.
2019/0070528 A1 3/2019 Luthe et al.

FOREIGN PATENT DOCUMENTS

CN 1337580 A 2/2002
CN 106807459 A 6/2017
(Continued)

OTHER PUBLICATIONS

Ota N, Yalikun Y, Suzuki T, Lee SW, Hosokawa Y, Goda K, Tanaka Y. 2019 Enhancement in acoustic focusing of micro and nanoparticles by thinning a microfluidic device. R. Soc. open sci. 6: 181776.
(Continued)

*Primary Examiner* — Walter D. Griffin
*Assistant Examiner* — Cameron J Allen
(74) *Attorney, Agent, or Firm* — CHIP LAW GROUP

(57) ABSTRACT

A fluid device includes: a flow main body including a side wall along a first axis and configured to flow a fluid from an inflow portion provided at one side of the first axis toward an outflow portion provided at the other side of the first axis; a plate provided at the other side of the first axis of the flow main body and having a first surface intersecting the first axis; a standing wall extending along the first axis from the first surface toward the one side of the first axis and having a length along the first axis shorter than the side wall; and an ultrasonic element disposed at an outer side of a collection region of the plate and configured to transmit an ultrasonic wave along the first axis when the standing wall and a region surrounded by the standing wall on the first surface are defined as the collection region.

17 Claims, 12 Drawing Sheets

(51) Int. Cl.
 *C02F 103/00* (2006.01)
 *C02F 101/30* (2006.01)

(56) References Cited

FOREIGN PATENT DOCUMENTS

| CN | 109069966 A | | 12/2018 | |
|---|---|---|---|---|
| JP | 2019507681 A | | 3/2019 | |
| JP | 2022069081 A | * | 5/2022 | |
| WO | WO-2010036667 A2 | * | 4/2010 | .......... A61M 1/3678 |

OTHER PUBLICATIONS

Office Action for CN Patent Application No. CN202111182951.1, dated Nov. 10, 2022, 10 pages of Office Action.

* cited by examiner

FLUID DEVICE

The present application is based on, and claims priority from JP Application Serial Number 2020-173212, filed Oct. 14, 2020, the disclosure of which is hereby incorporated by reference herein in its entirety.

BACKGROUND

1. Technical Field

The present disclosure relates to a fluid device that treats a fluid.

2. Related Art

In recent years, a problem of marine plastic waste has attracted attention in the world, and reduction of the plastic waste is urgently needed. Examples of the marine plastic waste include plastic bags and PET bottles, and fine particulate microplastics. Such microplastics are contained in washing water after washing clothes, washing water for toothpaste and a facial cleanser, and a technique for removing fine particles such as microplastics from these fluids is required.

As a method of removing the fine particles contained in the fluid, for example, there is a microfluidic chip (see, for example, Nobutoshi Ota et al., Enhancement in acoustic focusing of micro and nanoparticles by thinning a microfluidic device", December 2019, Royal Society Open Science, Vol. 6, Issue 2, Article No. 181776 (non-Patent Literature 1)).

For example, a fluid device disclosed in non-Patent Literature 1 includes a flow path substrate (glass substrate) in which a flow path is formed and a piezoelectric element provided on the flow path substrate. An ultrasonic wave generated by the piezoelectric element is transmitted into the flow path via the flow path substrate, and a standing wave is generated in a fluid in the flow path. The fine particles in the fluid converge in a predetermined range in the flow path due to a pressure gradient of the fluid formed by the standing wave.

Therefore, it is possible to separate the fluid and the fine particles by separating the fine particles that have converged on a portion of a node of the standing wave.

However, in the microfluidic chip disclosed in non-Patent Literature 1, it is necessary to form the standing wave in the flow path, and in order to form an appropriate standing wave, a flow path width cannot be increased. That is, in order to efficiently remove the fine particles from a large amount of water such as the washing water, it is necessary to increase the flow path width and increase a flow velocity. However, conditions of the standing wave for capturing the fine particles are limited to the flow path width. When the flow path width is large, it is also necessary to increase a sound pressure of the ultrasonic wave, and when the sound pressure is increased, a harmonic is generated and a waveform of the ultrasonic wave is distorted. Further, an acoustic flow is easily generated. Further, when the flow path width is large, the standing wave having a plurality of nodes is formed in the flow path. Therefore, it is difficult to form the standing wave with a fixed position in the flow path as the node.

Further, it is also conceivable to increase the flow velocity of the fluid in order to increase a flow rate of the fluid. However, even when the flow velocity is increased, it is necessary to increase the sound pressure of the ultrasonic wave, and it is difficult to form the standing wave in the same manner as described above.

SUMMARY

A fluid device according to a first aspect of the present disclosure includes: a flow main body including a side wall along a first axis and configured to flow a fluid from an inflow portion provided at one side of the first axis toward an outflow portion provided at the other side of the first axis; a plate provided at the other side of the first axis of the flow main body and having a first surface intersecting the first axis; a standing wall extending from the first surface toward the one side of the first axis and having a length along the first axis shorter than the side wall; and an ultrasonic element disposed at an outer side of a collection region of the plate and configured to transmit an ultrasonic wave along the first axis when the standing wall and a region surrounded by the standing wall on the first surface are defined as the collection region.

A fluid device according to a second aspect of the present disclosure includes: a flow main body including a side wall along a first axis and configured to flow a fluid from an inflow portion provided at one side of the first axis toward an outflow portion provided at the other side of the first axis; a standing wall provided at the other side of the first axis of the flow main body, having an axial direction along the first axis, extending along the first axis, and having a length along the first axis shorter than the side wall; and an ultrasonic element configured to transmit a beam-shaped ultrasonic wave surrounding the standing wall along the first axis between the standing wall and the side wall when viewed along the first axis.

DESCRIPTION OF EXEMPLARY EMBODIMENTS

Hereinafter, a fluid device of an embodiment according to the present disclosure will be described.

Figure 1:
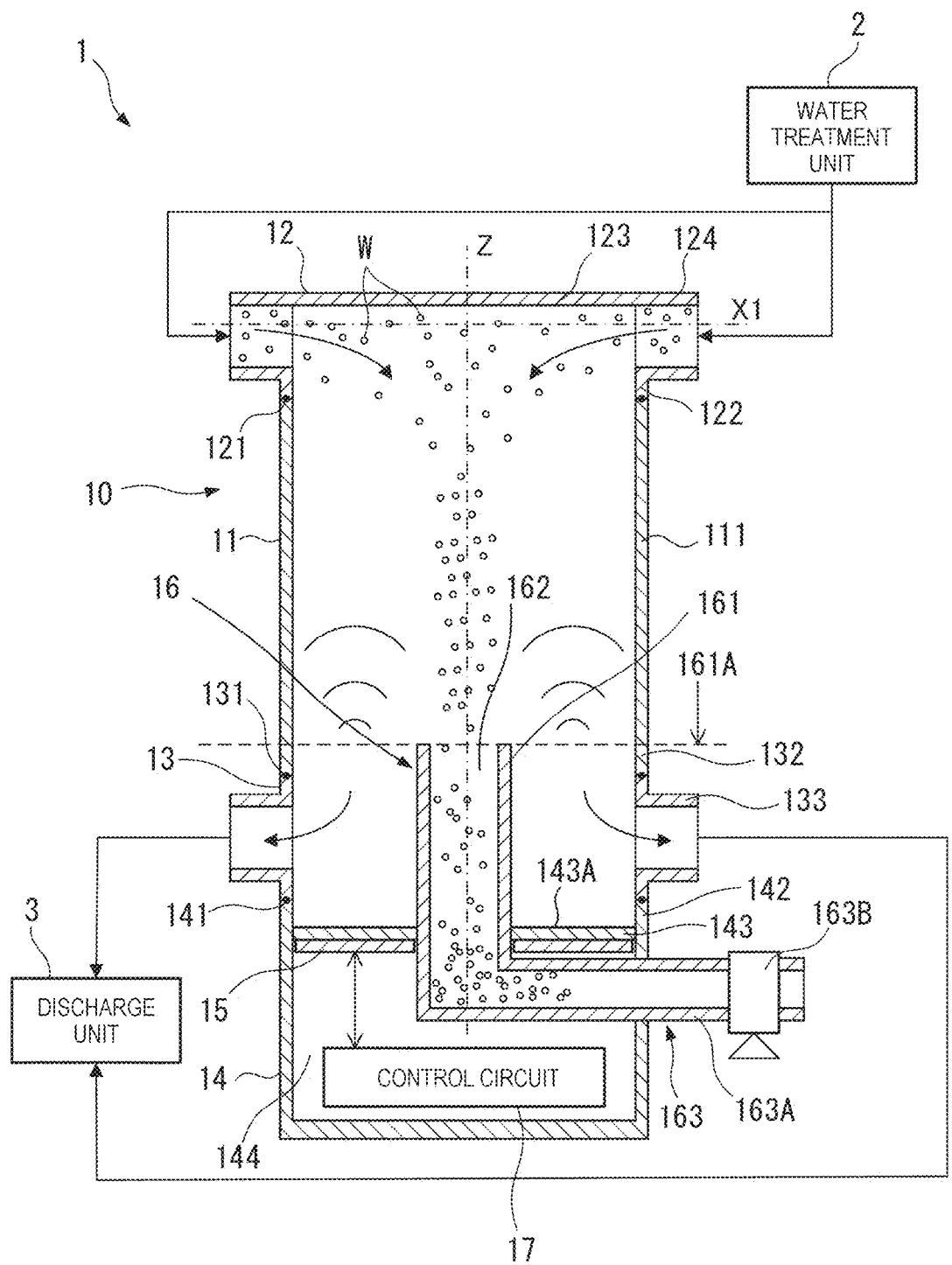
FIG. 1 shows a schematic configuration of a drainage system including a fluid device according to an embodiment of the present disclosure.

FIG. 1 shows a schematic configuration of a drainage system 1 including a fluid device 10 according to the present embodiment.

The drainage system 1 according to the present embodiment is, for example, a mechanism that introduces water (fluid) discharged from a water treatment unit 2 such as a washing machine or a washstand into the fluid device 10, removes fine particles W such as microplastics from the fluid by the fluid device 10, causes, as wastewater, the fluid from which the fine particles W are removed to flow into a discharge unit 3, and discharges the wastewater from the discharge unit 3 to a sewage pipe.

Configuration of Fluid Device

Figure 2:
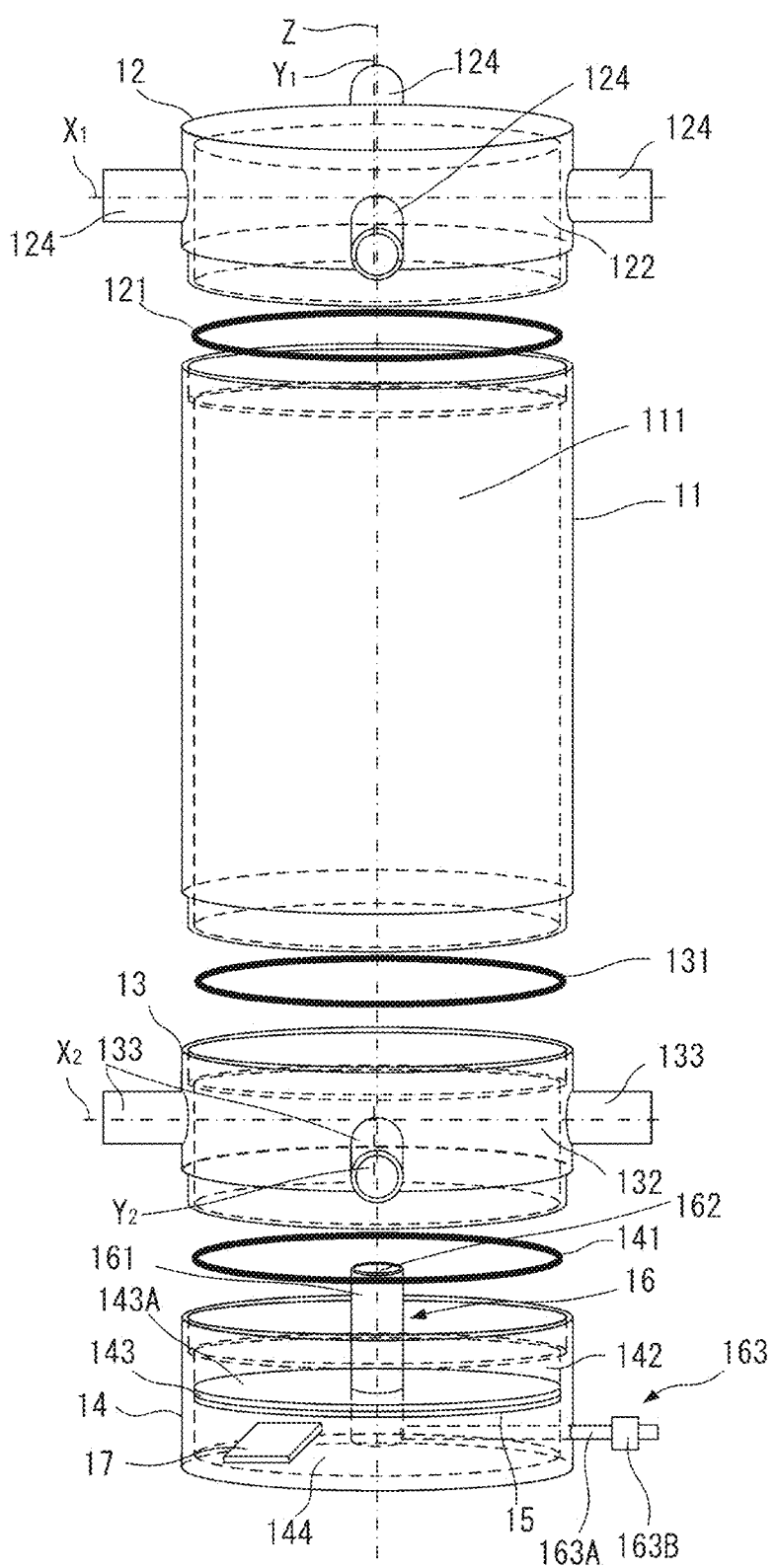
FIG. 2 is an exploded view of the fluid device according to the present embodiment.

FIG. 2 is an exploded view of the fluid device 10.

As shown in FIGS. 1 and 2, the fluid device 10 includes a body portion 11, an inflow portion 12 coupled to one end portion of the body portion 11, an outflow portion 13 coupled to the other end portion of the body portion 11, and a collection drive unit 14 provided with an ultrasonic element 15 and a collecting unit 16. The body portion 11, the inflow portion 12, and the outflow portion 13 constitute a flow main body according to the present disclosure.

Configuration of Body Portion 11

The body portion 11 includes a first side wall 111 extending along a Z axis as a first axis. The first side wall 111 has a cylindrical shape with the Z axis as a central axis. A shape of the first side wall 111 in a cross section orthogonal to the Z axis is not particularly limited, and as shown in FIG. 2, the first side wall 111 is preferably formed in a cylindrical shape. By being formed in a cylindrical shape, occurrence of a turbulent flow in the body portion 11 can be reduced.

In the body portion 11, the fluid flowing in from the inflow portion 12 flows from the inflow portion 12 toward the outflow portion 13 along the Z axis.

Configuration of Inflow Portion 12

The inflow portion 12 is a portion into which the fluid to flow into the body portion 11 is introduced, and is coupled to the body portion 11 via an inflow-side seal mechanism 121 configured with, for example, an O-ring. The inflow portion 12 includes a second side wall 122, an inflow-side lid portion 123, and an inflow port 124.

The second side wall 122 is formed in a cylindrical shape continuous with the first side wall 111. That is, the second side wall 122 has a cylindrical shape with the Z axis as the central axis, and has an opening on a body portion 11 side communicating with a cylindrical inside of the first side wall 111 of the body portion 11.

The inflow-side lid portion 123 closes an end surface of the second side wall 122 on a side opposite to the body portion 11. In the present embodiment, an ultrasonic wave is transmitted along the Z axis into the fluid device 10 by the ultrasonic element 15, which will be described later, and the ultrasonic wave is preferably a non-standing wave. In this case, a surface of inflow-side lid portion 123 in contact with the fluid may be an absorption surface for absorbing a sound wave. Accordingly, formation of a standing wave in the fluid device 10 can be prevented.

The inflow port 124 is coupled to the second side wall 122, and allows the fluid discharged from the water treatment unit 2 to flow into the cylindrical inside of the fluid device 10 along a second axis intersecting the Z axis. Preferably, the second axis is orthogonal to the Z axis as the first axis, and the fluid is allowed to flow toward the Z axis.

More preferably, a plurality of inflow ports 124 are provided in the inflow portion 12, and the plurality of inflow ports 124 are disposed to face each other with the Z axis interposed therebetween. Accordingly, a stress toward the Z axis as the central axis of the fluid device 10 is applied to the particles in the fluid introduced from each inflow port 124.

Further, the second axis is not limited to one axis direction orthogonal to the Z axis. That is, the second axis may be a plurality of axes orthogonal to the Z axis. For example, in the present embodiment, as shown in FIG. 2, when an axis orthogonal to the Z axis is defined as $X_1$ axis and an axis orthogonal to the Z axis and the $X_1$ axis is defined as a $Y_1$ axis (see FIG. 2), a pair of inflow ports 124 facing the Z axis on the $X_1$ axis and a pair of inflow ports 124 facing the Z axis on the $Y_1$ axis are provided.

Configuration of Outflow Portion 13

The outflow portion 13 is a portion through which the fluid flowing through the body portion 11 flows to an outside, and is coupled to the body portion 11 via an outflow-side seal mechanism 131 configured with, for example, an O-ring. The outflow portion 13 includes a third side wall 132 and an outflow port 133.

The third side wall 132 is formed in a cylindrical shape continuous with the first side wall 111. That is, the third side wall 132 has a cylindrical shape with the Z axis as the central axis, and has an opening end on the body portion 11 side communicating with the cylindrical inside of the first side wall 111 of the body portion 11.

The outflow port 133 is coupled to the third side wall 132, and allows the fluid flowing through the fluid device 10 to flow out to the discharge unit 3. A configuration of the outflow port 133 is not particularly limited as long as the configuration allows the fluid to flow out to the outside, and as shown in FIGS. 1 and 2, the outflow port 133 is preferably coupled to the third side wall 132 and preferably allows the fluid to flow out from the cylindrical inside of the fluid device 10 along a third axis intersecting the Z axis. That is, the ultrasonic element 15 is disposed on a drive plate 143 to be described later, and the ultrasonic element 15 is provided so as to cover the entire drive plate 143 except for the collecting unit 16. In such a configuration, when the outflow port 133 is coupled to the drive plate 143, an arrangement area of the ultrasonic element 15 is reduced, and thus a sound pressure of the ultrasonic wave transmitted from the ultrasonic element 15 is reduced. In contrast, by coupling the outflow port 133 to the third side wall 132, the arrangement area of the ultrasonic element 15 can be sufficiently ensured.

Further, a direction in which the fluid is discharged from the outflow port 133, that is, the third axis as an axis of the outflow port 133 does not need to be orthogonal to the Z axis, unlike the second axis ($X_1$ axis and $Y_1$ axis). That is, the direction of the outflow port 133 is not particularly limited as long as the fluid is allowed to flow out from the third side wall 132. In the present embodiment, the outflow port 133 is provided along an $X_2$ axis (see FIG. 2) parallel to the $X_1$ axis and a $Y_2$ axis parallel to the $Y_1$ axis. Alternatively, for example, the outflow port 133 may be provided along an axis at an angle of 45 degrees with respect to the $X_2$ axis and the $Y_2$ axis. Further, when viewed from the Z direction, the outflow port 133 allowing the fluid to discharge in a tangential direction of the third side wall 132 may be provided.

Furthermore, a plurality of outflow ports 133 are preferably provided at positions symmetrical with respect to the Z axis. Accordingly, in the fluid device 10, a flow of the fluid along the Z axis from the inflow portion 12 toward the outflow portion 13 can be made uniform. The positions symmetrical with respect to the Z axis may be, for example, such that the outflow ports 133 are provided at positions opposite to each other with the Z axis interposed therebetween, or such that the outflow ports 133 are rotationally symmetrical when viewed from the Z direction, that is, the outflow ports 133 may be provided at equal angular intervals around the Z axis.

Configuration of Collection Drive Unit 14

The collection drive unit 14 is provided at an outflow portion 13 side of the flow main body including the body portion 11, the inflow portion 12, and the outflow portion 13. The collection drive unit 14 is coupled to the outflow portion 13 via a drive seal mechanism 141 configured with, for example, an O-ring. The collection drive unit 14 includes a fourth side wall 142, the drive plate 143, a storage box 144, the ultrasonic element 15, the collecting unit 16, and a control circuit 17.

The fourth side wall 142 is formed in a cylindrical shape continuous with the third side wall 132. That is, the fourth side wall 142 has a cylindrical shape with the Z axis as the central axis, and has an opening end on the outflow portion 13 side communicating with the cylindrical inside of the third side wall 132 of the outflow portion 13.

The drive plate 143 corresponds to a plate according to the present disclosure, and closes an end surface of the fourth side wall 142 at a side opposite to the outflow portion 13. The drive plate 143 is formed by, for example, a plate-shaped member, and a surface at the outflow portion 13 side configures a drive surface 143A as a first surface according to the present disclosure. The ultrasonic element 15 is disposed at a side of the drive plate 143 opposite to the drive surface 143A. As will be described in detail later, when the ultrasonic element 15 is driven, the ultrasonic wave is transmitted from the drive surface 143A into the fluid in the fluid device 10.

Further, the collecting unit 16 that collects the fine particles W in the fluid is provided at a center of the drive surface 143A, that is, at a position at which the drive surface 143A and the Z axis intersect each other. Details of the collecting unit 16 will be described below.

The storage box 144 is a storage portion provided at a side opposite to the outflow portion 13 with the drive plate 143 interposed therebetween in the collection drive unit 14, and is provided with the ultrasonic element 15 and the control circuit 17.

Configuration of Ultrasonic Element 15

As shown in FIGS. 1 and 2, the ultrasonic element 15 is disposed on a surface of the drive plate 143 at the side opposite to the drive surface 143A.

Figure 3:
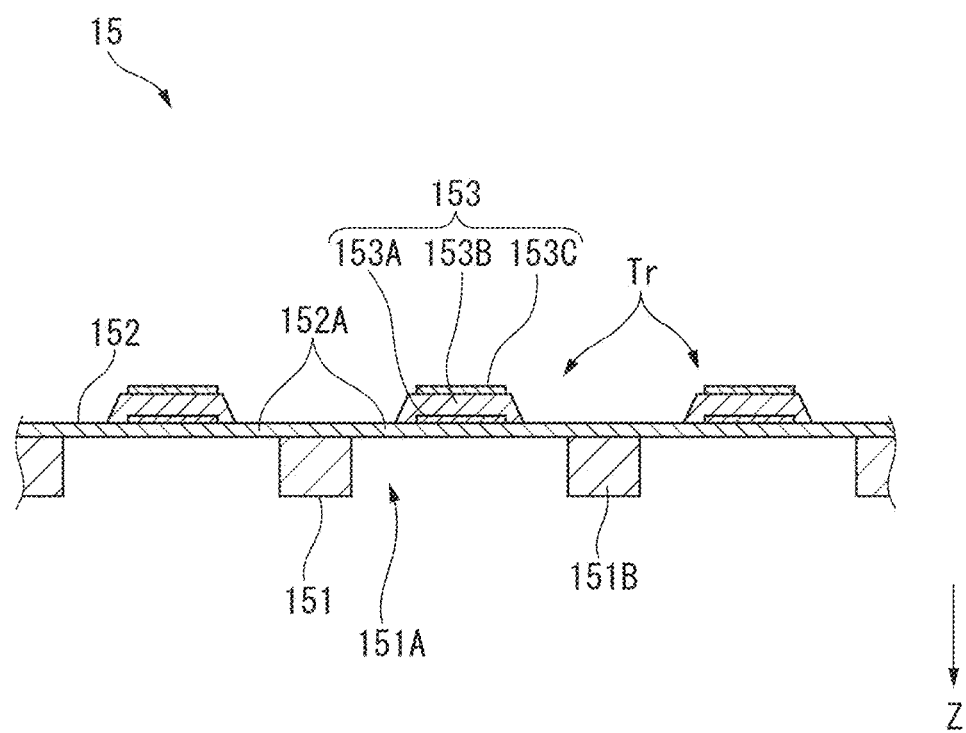
FIG. 3 is a cross-sectional view showing a schematic configuration of an ultrasonic element according to the present embodiment.

FIG. 3 is a cross-sectional view showing a schematic configuration of the ultrasonic element 15.

As shown in FIG. 3, the ultrasonic element 15 includes an element substrate 151, a vibration plate 152, and a piezoelectric element 153.

Here, in the following description, a substrate thickness direction of the element substrate 151 is a direction parallel to the Z axis, and a +Z as a direction of arrows in FIG. 3 is a transmission direction of the ultrasonic wave, that is, a direction toward the inflow portion 12.

The element substrate 151 is a substrate supporting the vibration plate 152, and is formed of a semiconductor substrate such as Si. The element substrate 151 is provided with an opening 151A penetrating the element substrate 151 along the Z direction parallel to the Z axis.

The vibration plate 152 is formed of $SiO_2$, a stacked body of $SiO_2$ and $ZrO_2$, and the like, and is provided at a −Z side of the element substrate 151. The vibration plate 152 is supported by a partition wall 151B of the element substrate 151 constituting the opening 151A, and closes the −Z side of the opening 151A. A portion of the vibration plate 152 that overlaps with the opening 151A when viewed from the Z direction constitutes a vibration portion 152A.

The piezoelectric element 153 is provided on the vibration plate 152 at a position overlapping each vibration portion 152A when viewed from the Z direction. As shown in FIG. 3, the piezoelectric element 153 is configured by stacking a first electrode 153A, a piezoelectric film 153B, and a second electrode 153C in this order toward the −Z side on the vibration plate 152.

Figure 4:
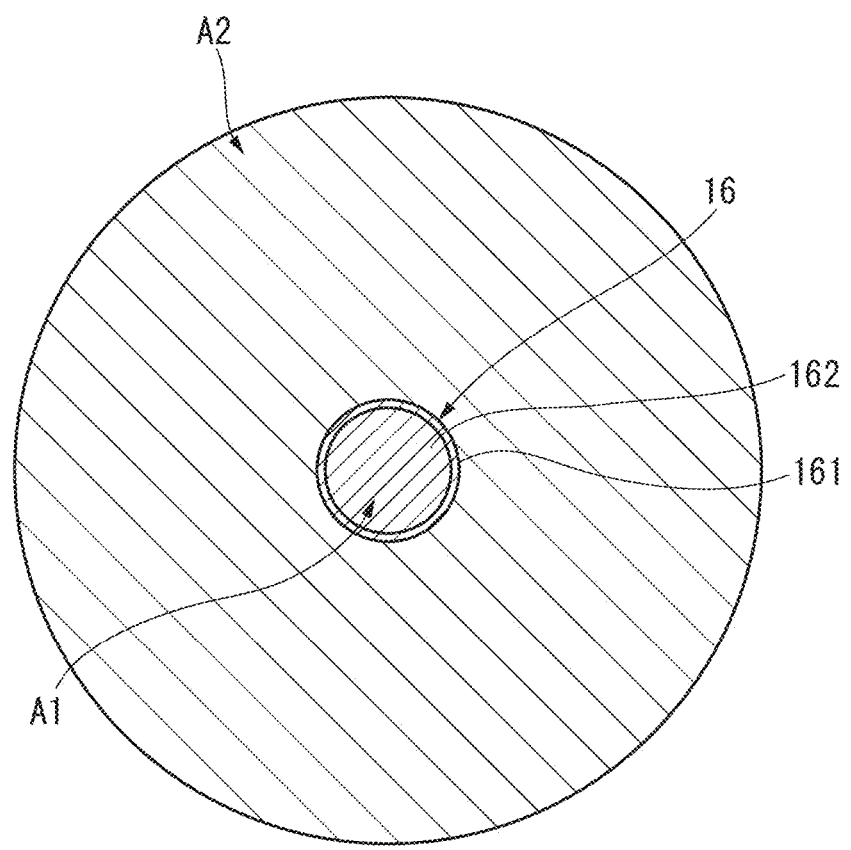
FIG. 4 is a plan view showing an arrangement region of the ultrasonic element when an outflow-side end plate is viewed from a Z direction in the present embodiment.

FIG. 4 is a plan view of the drive plate 143 as viewed from the Z direction, and shows an arrangement region of the ultrasonic element 15.

In the present embodiment, one vibration portion 152A and the piezoelectric element 153 provided on the vibration portion 152A constitute one ultrasonic transducer Tr. Although illustration is omitted, in the present embodiment, the ultrasonic element 15 is configured by arranging such an ultrasonic transducer Tr in a two-dimensional array structure.

Further, in the present embodiment, as shown in FIG. 4, the ultrasonic element 15 is disposed so as to cover an entire region (surrounding region A2) of the drive plate 143 excluding a region (collection region A1) where the collecting unit 16 and the drive plate 143 overlap each other, that is, in the surrounding region A2 surrounding the collection region A1.

In such an ultrasonic element 15, when a pulse wave voltage of a predetermined frequency is applied between the first electrode 153A and the second electrode 153C of each ultrasonic transducer Tr, the piezoelectric film 153B expands and contracts. Accordingly, the vibration portion 152A vibrates at a frequency corresponding to an opening width of the opening 151A, and the ultrasonic wave is transmitted from the vibrating portion 152A toward a +Z side, that is, toward the inflow portion 12.

Further, in the present embodiment, a surface of the element substrate 151 at a side opposite to the vibration plate 152 is bonded to the surface of the drive plate 143 at the side opposite to the drive surface 143A. In this case, each opening 151A is filled with an acoustic layer having substantially the same acoustic impedance as that of the drive plate 143. Accordingly, the ultrasonic wave output from the ultrasonic transducer Tr can be transmitted to the fluid in the fluid device 10 via the acoustic layer and the drive plate 143.

As described above, since the ultrasonic element 15 is provided at the surrounding region A2 surrounding the collection region A1, when the ultrasonic wave is transmitted from the ultrasonic element 15 along the Z axis, a cylindrical ultrasonic beam can be formed in the fluid device 10.

In the example shown in FIG. 3, the drive plate 143, the element substrate 151, and the vibration plate 152 are separate members, whereas the present disclosure is not limited thereto. For example, the drive plate 143 may be configured with the element substrate 151 and the vibration plate 152. In this case, since the vibration plate 152 is in direct contact with the fluid in the fluid device 10, it is not necessary to fill the acoustic layer, sound pressure attenuation by the acoustic layer can be prevented, and the ultrasonic wave can be efficiently propagated to the fluid.

Further, the present embodiment describes an example in which the ultrasonic element 15 is configured by arranging the ultrasonic transducers Tr that transmit the ultrasonic waves by vibrating the vibration portion 152A in an array shape, whereas the present disclosure is not limited thereto. For example, a bulk piezoelectric body may be fixed to the drive plate 143, and a voltage may be applied to the piezoelectric body to vibrate the piezoelectric body itself to transmit the ultrasonic wave.

Further, in the example shown in FIG. 3, the vibration portion 152A vibrates at the frequency corresponding to the opening width of the opening 151A, and the ultrasonic wave is transmitted from the vibrating portion 152A toward the +Z side, that is, toward the inflow portion 12, whereas the present disclosure is not limited thereto. For example, although not shown, the vibration plate 152 may be configured to be partitioned into a plurality of vibration portions 152A using a vibration prevention portion such as a resist, and the drive plate 143 may be configured with the vibration plate 152. In this case, the element substrate 151 is not necessary, and a distance between the vibration portions 152A can be smaller than that of the partition walls 151B of the element substrate 151. Therefore, an area in which the vibration plate 152 is in direct contact with the fluid in the fluid device 10 increases, the sound pressure attenuation can be prevented, and the ultrasonic wave can be efficiently propagated to the fluid.

Configuration of Collecting Unit 16

Next, the collecting unit 16 provided in the drive plate 143 will be described.

The collecting unit 16 has a cylindrical standing wall 161 with the Z axis as a central axis, and an inside of the standing wall 161, that is, a cylindrical inside surrounded by the cylindrical standing wall 161 constitutes an accumulation portion 162 in which the fine particles W in the fluid are accumulated.

The standing wall 161 extends from the drive surface 143A as the first surface till a first position 161A (see FIG. 1) toward the inflow portion 12. That is, a length of the standing wall 161 along the Z axis is shorter than a length of the side wall (the first side wall 111, the second side wall 122, the third side wall 132, and the fourth side wall 142) of the flow main body.

Here, the first position 161A is a position at which a stress acting on the fine particles W in the fluid toward the side wall (the first side wall 111, the second side wall 122, the third side wall 132, and the fourth side wall 142) by the flow of the fluid is balanced with the stress toward the Z axis. Accordingly, the movement of the fine particles W accumulated in the accumulation portion 162 inside the standing wall 161 to the side wall side is prevented by the standing wall 161.

Details of the first position 161A will be described later.

Further, the collecting unit 16 is provided with a collecting mechanism 163 that collects the accumulated fine particles W.

For example, in the present embodiment, as shown in FIGS. 1 and 2, the standing wall 161 is provided so as to penetrate the drive plate 143, and a fine particle collection tube 163A constituting the collecting mechanism 163 is coupled to a side of the standing wall 161 opposite to the inflow portion 12. The fine particle collection tube 163A includes a collection valve 163B, and when the collection valve 163B is opened, the fine particles W accumulated in the collecting unit 16 are discharged and removed from the fine particle collection tube 163A.

A configuration of the collecting mechanism 163 is not particularly limited as long as the collecting mechanism 163 is a mechanism that collects the fine particles W accumulated in the collecting unit 16. For example, the collecting unit 16 may be formed in a container shape including the standing wall 161 and a bottom portion that closes an end surface of the standing wall 161 on a drive plate 143 side, and the collecting mechanism 163 may be a mechanism that detachably fixes the collecting unit 16 to the drive plate 143. In this case, the fine particles W accumulated in the collecting unit 16 can be collected by removing the collecting unit 16 from the drive plate 143.

Configuration of Control Circuit 17

The control circuit 17 is a circuit that controls the ultrasonic element 15. The control circuit 17 outputs a pulse drive voltage of a predetermined period to each ultrasonic transducer Tr, and causes the ultrasonic element 15 to transmit the ultrasonic wave to the fluid inside the fluid device 10.

Principle of Collecting Fine Particles W in Fluid Device 10

Next, a principle of collecting the fine particles W in the fluid using the fluid device 10 as described above will be described.

Stress Applied to Fine Particles W in Fluid by Ultrasonic Wave

Figure 5:
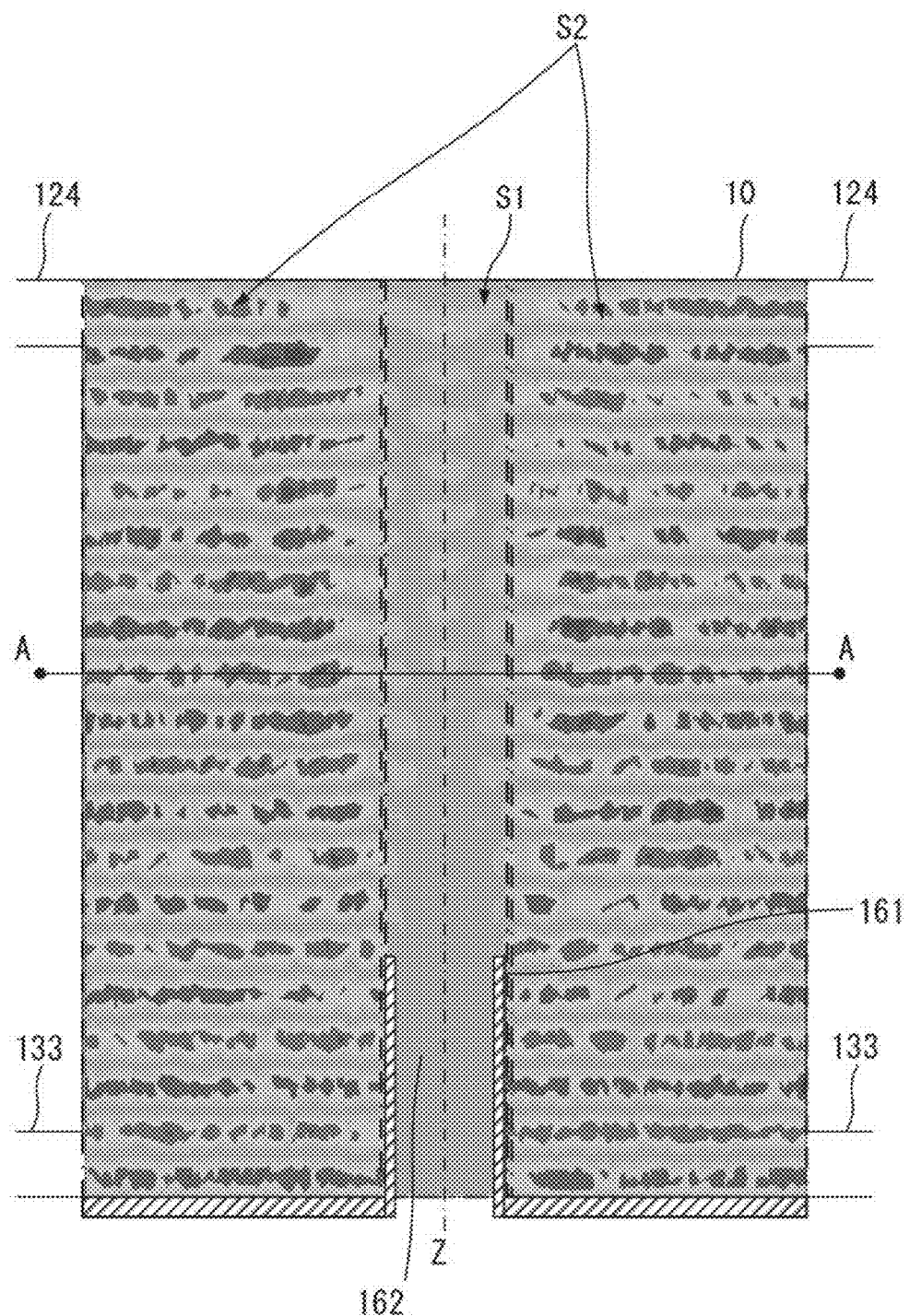
FIG. 5 shows a sound pressure distribution of an ultrasonic wave when the ultrasonic wave is transmitted from the ultrasonic element in the fluid device according to the present embodiment.
Figure 6:
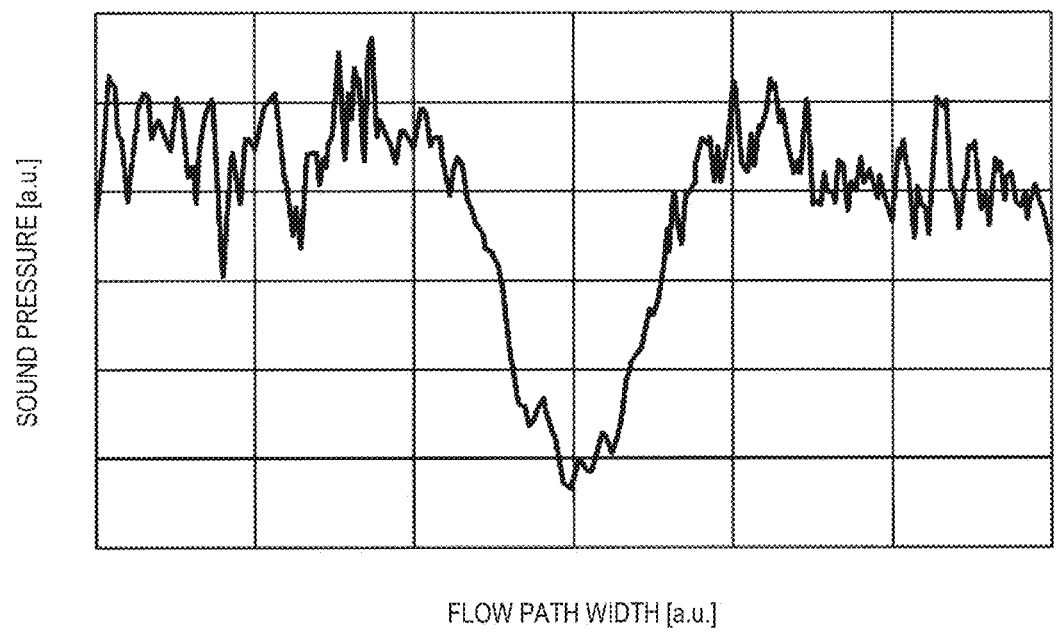
FIG. 6 shows a sound pressure distribution along a line A-A in FIG. 5.

FIG. 5 shows a sound pressure distribution of the ultrasonic wave when the ultrasonic wave is transmitted from the ultrasonic element 15 in the fluid device 10. FIG. 6 shows a sound pressure distribution along a line A-A in FIG. 5.

In the present embodiment, when the ultrasonic wave is transmitted from the ultrasonic element 15, the ultrasonic beam along the Z axis from the outflow portion 13 toward the inflow portion 12 is formed. Here, as shown in FIG. 5, in the sound pressure distribution in a cross-sectional view taken along an XZ plane, a sound pressure in a region (central axis region S1) centered on the Z axis, which is extension of the collecting unit 16, is smaller than the sound pressure in a region (outer peripheral region S2) which is extension from the standing wall 161 to the side wall. That is, as described above, the cylindrical ultrasonic beam is formed in the fluid from the ultrasonic element 15.

When such an ultrasonic beam is formed, a stress in a predetermined direction acts on the fine particles W in the fluid by the ultrasonic wave.

That is, when the ultrasonic wave is transmitted into the fluid, due to a difference in the acoustic impedance, a part of the ultrasonic wave is reflected and a part of the ultrasonic wave is transmitted at a boundary between the fluid and the fine particles W in the fluid. In this case, a difference in acoustic energy density occurs between an inside and an outside of the fine particles W, and a pressure difference corresponding to the difference in the acoustic energy density occurs. The pressure difference is an acoustic radiation pressure applied to the fine particles W, and an acoustic radiation force acting on the fine particles W is obtained by integrating the pressure difference with an area of the fine particles W. In the present embodiment, a sound field condition under which the ultrasonic wave is transmitted to a sufficiently large fluid space with respect to the fine particles W is satisfied, and a Langevin radiation pressure is received as the acoustic radiation pressure.

When the sound pressure of the ultrasonic wave at a certain fixed position is approximated within a range of a first order linear theory, the sound pressure of the ultrasonic wave changes in a sine wave shape, and therefore, when the sound pressure of the ultrasonic wave is time-averaged, the sound pressure becomes 0. That is, the fine particles W are not stressed by the ultrasonic wave. However, in practice, due to various sound field conditions, the sound pressure of the ultrasonic wave deviates from the linear range based on the linear theory, and a range of minute amount after a second order becomes large. The minute amount after the second order does not become 0 even when the sound pressure of the ultrasonic wave is time-averaged, and this acts, as the acoustic radiation pressure described above, on the fine particles W.

The acoustic radiation pressure will be described more specifically. It is assumed that spherical fine particles W having a radius a are present in a planar travelling wave sound field of the ultrasonic wave travelling in the fluid, an acoustic intensity of an emitted ultrasonic wave when the fine particles W are not present in the fluid is defined as I, and a sound velocity in the fluid is defined as $c_0$. In this case, an acoustic radiation force $F_1$ is expressed by the following Equation (1). When $I/c_0$ corresponds to an acoustic energy density $E_i$ of an input ultrasonic wave, an amplitude of the ultrasonic wave is $p_0$ and a density of the fluid is $\rho_0$, $E_i = p_0^2/2\rho_0 c_0^2$. Further, $\rho_0 c_0$ is the acoustic impedance in the fluid.

$$F_1 = \pi a^2 \frac{I}{c_0} Y_P \tag{1}$$

In Equation (1), $Y_p$ is an acoustic radiation force function, and is represented by the following Equation (2). In Equation (2), k is the wave number of the ultrasonic wave travelling in the fluid, and when a frequency of the ultrasonic wave is $\omega_0$, $k=\omega_0/c_0$. Further, $\rho$ is a density of the fine particles W in the fluid, and c is a sound velocity in the fine particles W. ka is set to be sufficiently smaller than 1.

$$Y_P = \frac{4}{3}ka\left(\frac{5-2\rho_0/\rho}{2+\rho_0/\rho} - \frac{\rho_0 c_0^2}{\rho c^2}\right) \tag{2}$$

Further, in the present embodiment, as described above, the ultrasonic wave is transmitted from the surrounding region A2 surrounding the collection region A1 toward the inflow portion 12 along the Z axis in the drive surface 143A, and the cylindrical ultrasonic beam is formed in the outer peripheral region S2 surrounding the central axis region S1. Therefore, a strong acoustic radiation pressure acts on the fine particles W in the outer peripheral region S2 to which the ultrasonic wave is transmitted. Therefore, the fine particles W in the outer peripheral region S2 receive the acoustic radiation force represented by Equation (2) toward the central axis region S1 on which the acoustic radiation pressure caused by the ultrasonic wave does not act, that is, from a high pressure side toward a low pressure side.

Further, in the present embodiment, the ultrasonic element 15 forms the ultrasonic beam as the non-standing wave with respect to the Z axis. That is, when the standing wave is formed along the Z axis, the fine particles W stagnate at a position of a node of the standing wave, and the movement of the fine particles W to the central axis region S1 is inhibited. In contrast, by forming the ultrasonic beam serving as the non-standing wave as described above, inconvenience that the fine particles W are captured at the node is reduced.

When the sound pressure of the ultrasonic wave transmitted from the ultrasonic element 15 is increased in order to increase the acoustic radiation force, a harmonic is likely to be generated. When such a harmonic is generated, a waveform of the ultrasonic wave is also distorted, and an ultrasonic component expressed by the second and subsequent terms in an approximate expression approximating the sound pressure of the ultrasonic wave becomes large. That is, by increasing the sound pressure of the ultrasonic wave, not only the formation of the standing wave can be inhibited, but also the acoustic radiation force can be increased, and the fine particles W in the fluid can be moved to the central axis region S1 around the Z axis with a stronger force.

Stress Applied to Fine Particles W by Fluid

In the present embodiment, a resistance force against the fluid flowing from the inflow portion 12 toward the outflow portion 13 acts on the fine particles W.

Figure 7:
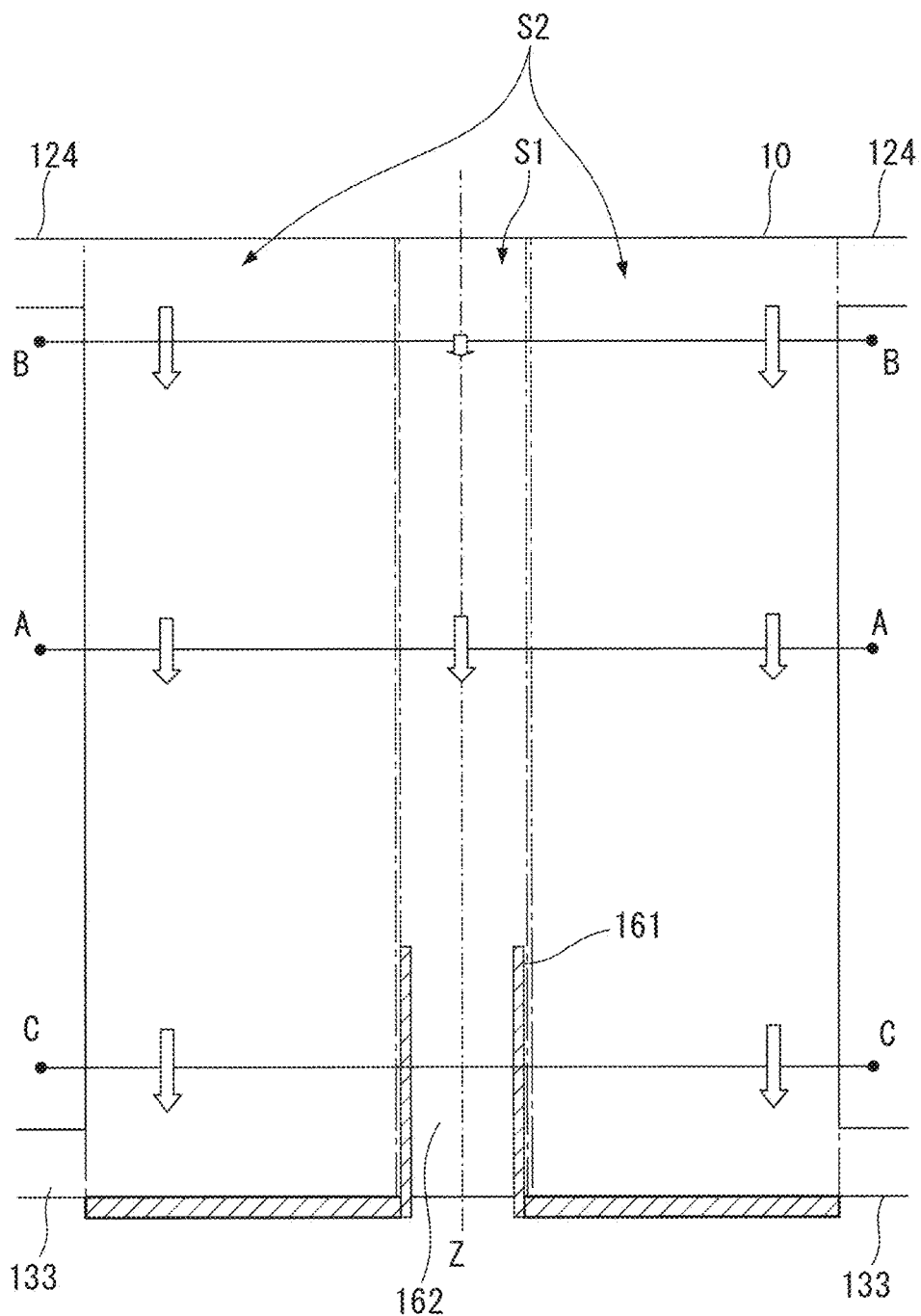
FIG. 7 shows a flow velocity distribution of a fluid in a direction parallel to a Z axis in the fluid device according to the present embodiment.
Figure 8:
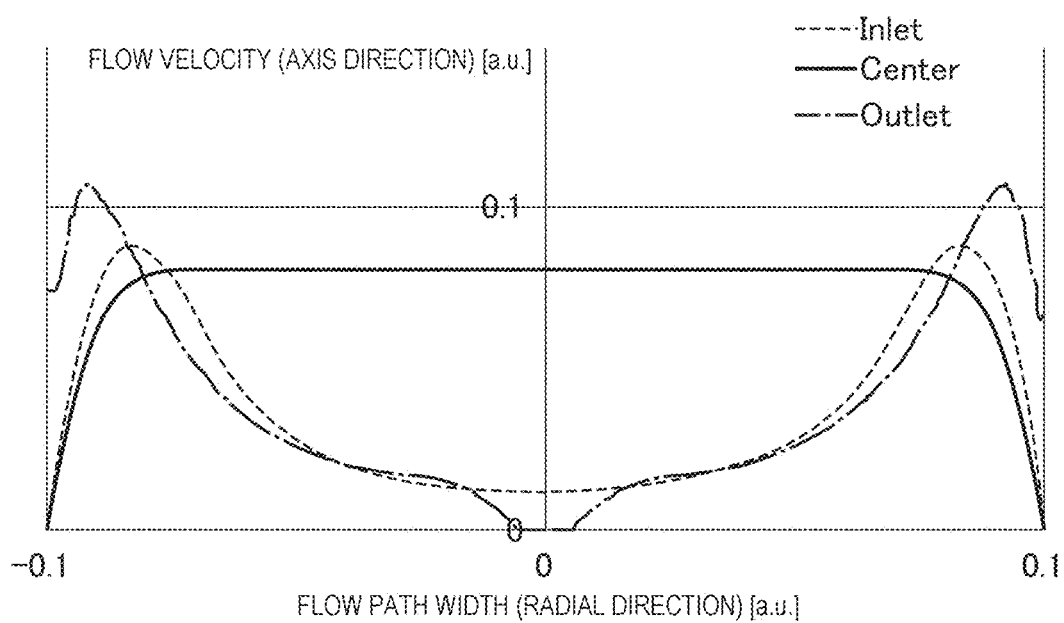
FIG. 8 shows a flow velocity distribution of the fluid in the direction parallel to the Z axis in the fluid device according to the present embodiment.

FIGS. 7 and 8 show a flow velocity distribution of the fluid in the direction parallel to the Z axis in the present embodiment. FIG. 7 shows the flow velocity of the fluid in the body portion 11, in the vicinity of the inflow portion 12, and in the vicinity of the outflow portion 13 by lengths of arrows. FIG. 8 shows flow velocity distributions on an X axis along a line A-A, a line B-B, and a line C-C in FIG. 7, in which a solid line shows the flow velocity distribution in the body portion 11 along the line A-A, a broken line shows the flow velocity distribution in the inflow portion 12 along the line B-B, and an alternate long and short dash line shows the flow velocity distribution in the outflow portion 13 along the line C-C.

In the present embodiment, in the fluid from the inflow portion 12 to the outflow portion 13 through the body portion 11, since the fluid flows in from each inflow port 124 in the inflow portion 12, the flow velocity in the direction parallel to the Z axis is high in the vicinity of the inflow port 124, and the flow velocity decreases as approaching the Z axis.

Further, in the body portion 11, the fluid flows at a substantially uniform flow velocity in an XY plane. That is, the fluid flowing in from the inflow portion 12 forms a laminar flow and flows toward the outflow portion 13 in a uniform flow.

On the other hand, in the direction along the Z axis, the flow velocity along the Z axis is not observed in the accumulation portion 162 between a tip of the standing wall 161 at the inflow portion 12 side and the drive surface 143A. That is, in the present embodiment, when the collection valve 163B of the fine particle collection tube 163A is in a closed state, there is no path through which the fluid flows toward the outflow port 133 in the accumulation portion 162 surrounded by the standing wall 161, and thus the flow velocity along the Z axis in the accumulation portion 162 is extremely close to 0.

Since the fluid flows toward the outflow port 133 between the standing wall 161 and the side wall on the outflow portion 13 side, the flow velocity increases toward the outflow port 133.

Figure 9:
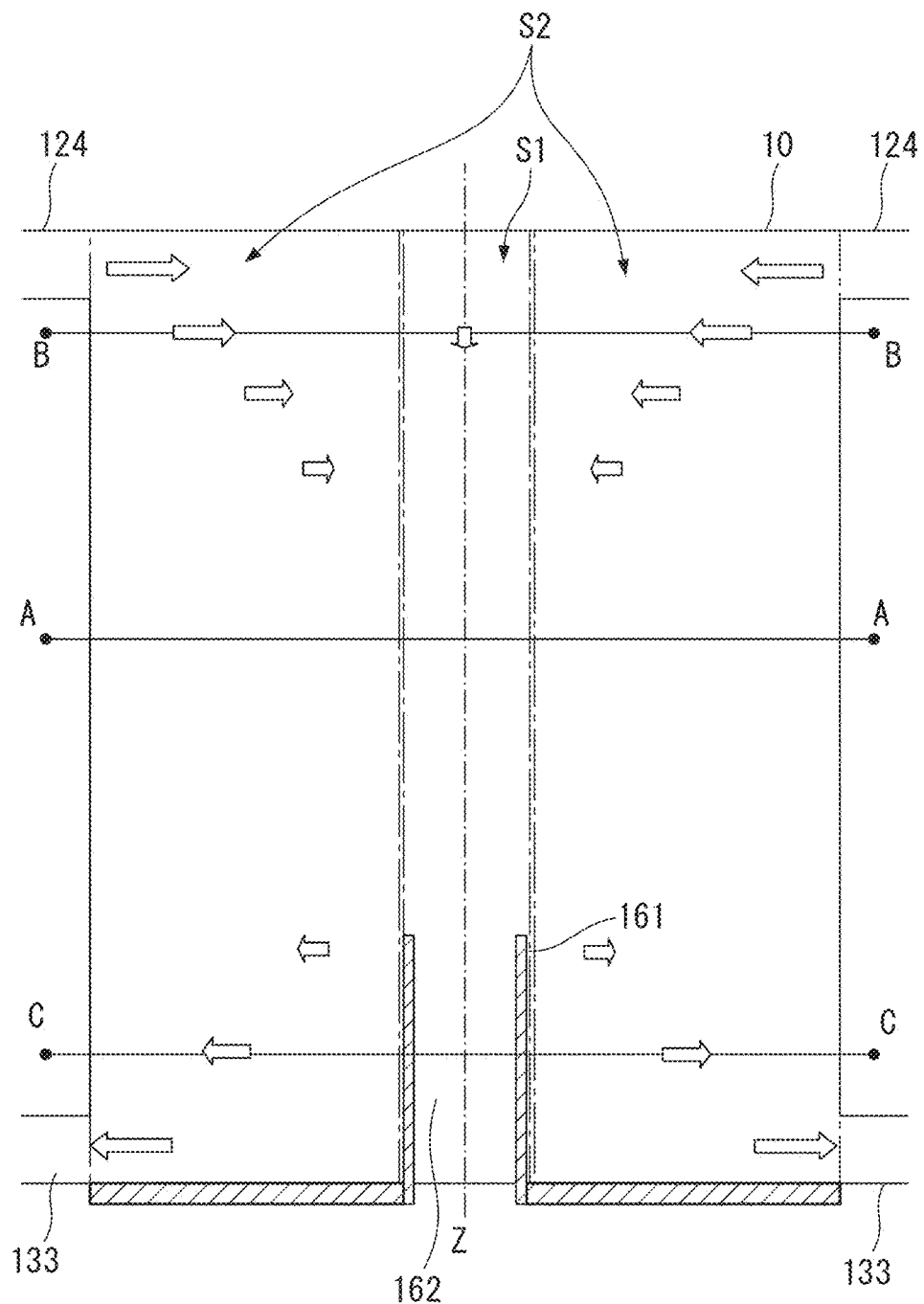
FIG. 9 shows a flow velocity distribution of a fluid in a direction orthogonal to the Z axis in the fluid device according to the present embodiment.
Figure 10:
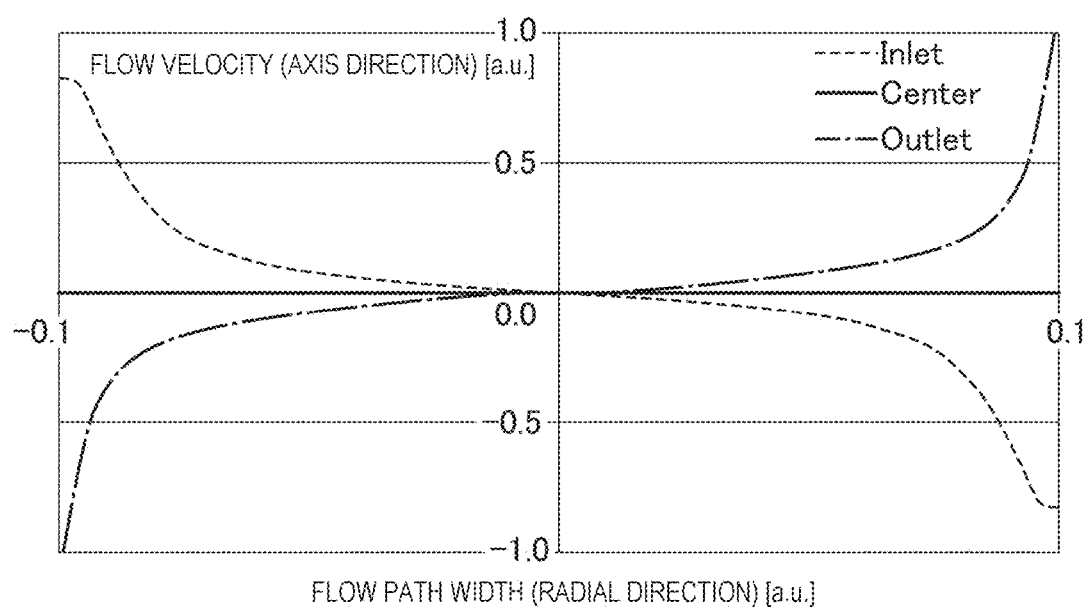
FIG. 10 shows a flow velocity distribution of the fluid in the direction orthogonal to the Z axis in the fluid device according to the present embodiment.

FIGS. 9 and 10 show a flow velocity distribution of the fluid in a direction orthogonal to the Z axis in the present embodiment.

FIG. 9 shows the flow velocity of the fluid in the body portion 11, the inflow portion 12, and the outflow portion 13 by lengths of arrows. FIG. 10 shows flow velocity distributions in the body portion 11 along a line A-A, in the inflow portion 12 along a line B-B, and in the outflow portion 13 along a line C-C of in FIG. 9, in which the solid line shows the flow velocity distribution along the line A-A, the broken line shows the flow velocity distribution along the line B-B, and the alternate long and short dash line shows the flow velocity distribution along the line C-C.

In the present embodiment, the fluid flows in from the inflow port 124 along the second axis (the $X_1$ axis and the $Y_1$ axis in FIG. 2) orthogonal to the Z axis, and the fluid flows out from the outflow port 133 along the third axis (the $X_2$ axis and the $Y_2$ axis in FIG. 2) intersecting the Z axis. Here, description is made assuming that the $X_1$ axis and the $X_2$ axis are parallel to each other. Further, in FIG. 9, a direction parallel to the $X_1$ axis and the $X_2$ axis and extending from a left side to a right side of the paper is defined as an X direction.

In the inflow portion 12, a flow velocity from the inflow port 124 toward the Z axis is generated. However, the flow velocity toward the Z axis gradually attenuates toward the outflow portion 13, and as shown in FIG. 10, the flow velocity along a plane direction of the XY plane becomes substantially 0 at a position of the line A-A. Further, the flow velocity toward the outflow port 133 is generated from the body portion 11 toward the outflow portion 13, and the flow velocity toward the outflow port 133 gradually increases.

The fine particles W in the fluid receive a resistance force D against the flow of the fluid as described above.

More specifically, assuming that the fine particles W have a sphere having a diameter d (d=2a), when a surface area of the fine particles W is A, a drag coefficient is $C_D$, a Reynolds number is $R_e$, a relative velocity of the fine particles W with respect to the flow velocity of the fluid is U, and a viscosity of the fluid is v, the following Equations (3) and (4) are established.

$$C_D = \frac{D}{\rho_0 U A / 2} \quad (3)$$

$$R_e = \frac{Ud}{v} \quad (4)$$

Figure 11:
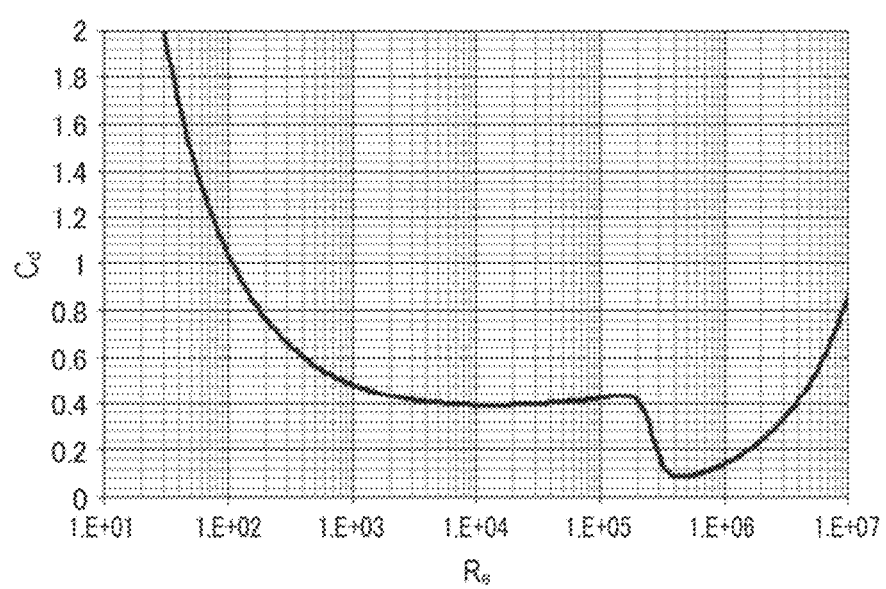
FIG. 11 shows a relationship between a drag coefficient and a Reynolds number.

FIG. 11 shows a relationship between the drag coefficient $C_D$ and the Reynolds number $R_e$.

The drag coefficient $C_D$ and the Reynolds number $R_e$ generally have the relationship as shown in FIG. 11, and the drag coefficient $C_D$ is determined as shown in FIG. 11 corresponding to the Reynolds number $R_e$ based on a size of the fine particles W, and the flow velocity and the viscosity of the fluid. Further, as in Equation (3), the resistance force D acting on the fine particles W is determined according to the drag coefficient $C_D$. That is, the fine particles W in the fluid receive the resistance force D against the flow of the fluid according to the viscosity and the flow velocity of the fluid and the size of the fine particles W.

2-3. Other Stress Applied to Fine Particles W

As described above, the fine particles W in the fluid to which the ultrasonic wave is transmitted are affected by the acoustic radiation force $F_1$ of the ultrasonic wave and the resistance force D against the flow of the fluid, and the fine particles W are also affected by a gravity $F_2$ and a buoyant force $F_3$. Here, the gravity $F_2$ is $F_2 = \rho Vg$ by a density $\rho$ of the particles, a volume V of the fine particles W, and a gravitational acceleration g. The buoyant force $F_3$ is $F_3 = \rho_0 Vg$. Therefore, a difference between the gravity $F_2$ and the buoyant force $F_3$ is a value obtained by multiplying a difference in densities between the fluid and the fine particles W by the volume V of the fine particles W and the gravitational acceleration g, and is a sufficiently small value that can be ignored with respect to the acoustic radiation force $F_1$ of the ultrasonic wave and the resistance force D against the flow of the fluid.

Figure 12:
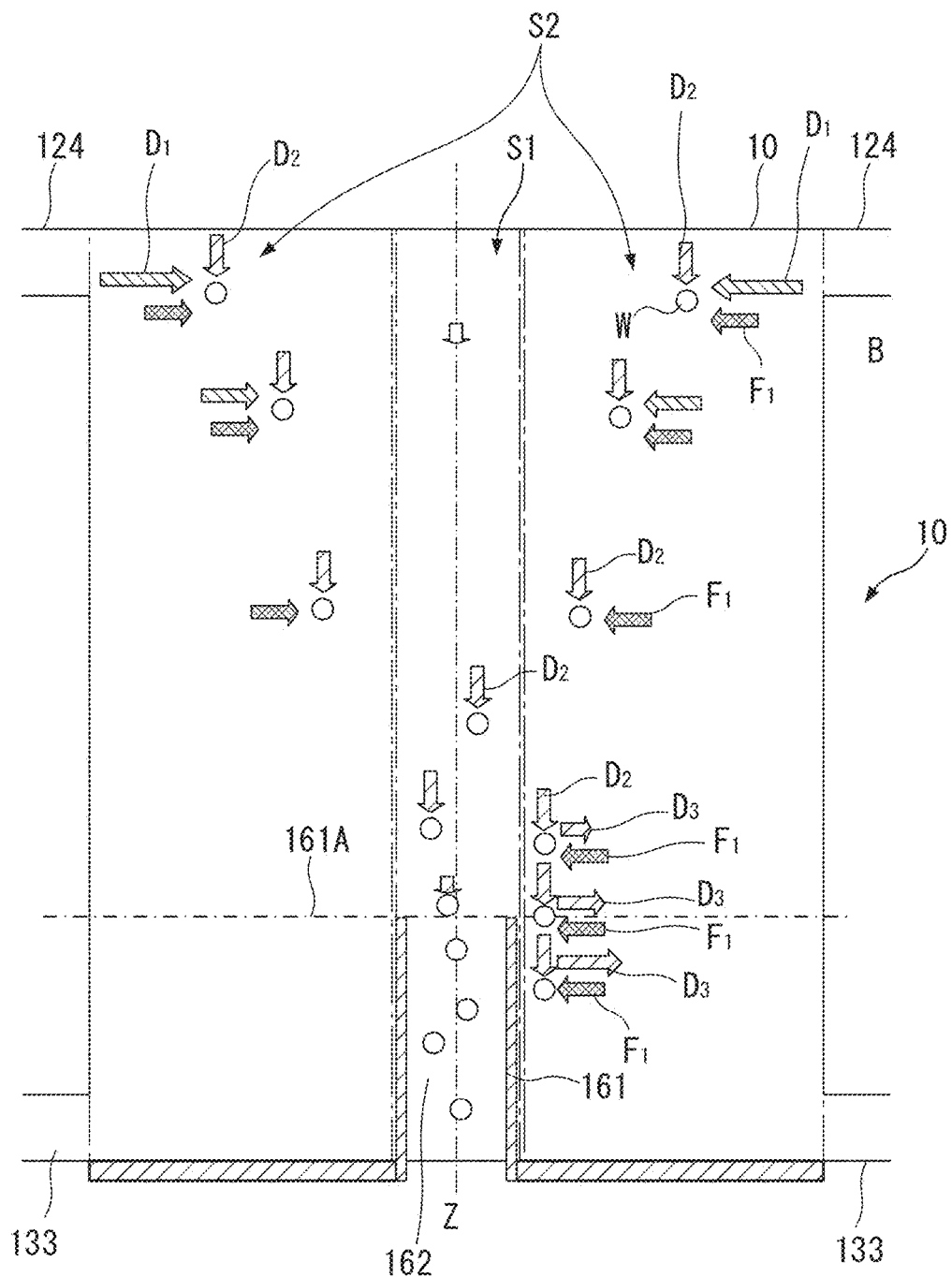
FIG. 12 shows a stress acting on fine particles in the fluid in the fluid device according to the present embodiment.

FIG. 12 shows the stress acting on the fine particles W in the fluid in the fluid device 10.

As shown in FIG. 12, as a force for moving the fine particles W in the fluid, the acoustic radiation force $F_1$ and the resistance force D against the flow of the fluid are dominant, and the fine particles W move based on the acoustic radiation force $F_1$ and the resistance force D against the flow of the fluid.

That is, in the present embodiment, first, the fine particles W are discharged toward the Z axis by a resistance force $D_1$ against the flow of the fluid flowing in from the inflow port 124. At this time, in the present embodiment, the inflow ports 124 are disposed to face each other with the Z axis interposed therebetween. Therefore, the movement of the fine particles W to the side wall on the opposite side beyond the Z axis is prevented.

Further, the fluid flowing into the fluid device 10 flows toward the outflow portion 13 along the Z axis, and the fine particles W are moved toward the outflow portion 13 by a resistance force $D_2$ against the flow of the fluid.

Further, in the outer peripheral region S2, since the cylindrical ultrasonic beam is formed along the Z axis from the drive surface 143A, the fine particles W located in the outer peripheral region S2 receive the acoustic radiation force $F_1$ and move toward the central axis region S1. That is, the resistance force $D_1$ based on the flow of the fluid from the inflow port 124 attenuates from the inflow portion 12 toward the outflow portion 13, but the acoustic radiation force $F_1$ always acts on the fine particles W in the outer peripheral region S2 in the fluid device 10. Therefore, even when the resistance force $D_1$ is small, the fine particles W are moved toward the central axis region S1 centered on the Z axis.

At this time, in the present embodiment, since the ultrasonic wave is transmitted from the drive surface 143A provided at the outflow portion 13 side toward the inflow portion 12, a braking effect by the ultrasonic wave is obtained. That is, when a moving velocity of the fine particles W moving by the flow of the fluid is high, the fine particles W may move between the standing wall 161 and the side wall without reaching the collecting unit 16. However, in the present embodiment, since the ultrasonic wave is transmitted from the drive surface 143A, the sound pressure of the ultrasonic wave at the outflow portion 13 side is large, and the acoustic radiation pressure applied to the fine particles W is also large. As described above, since the fine particles W move from the high pressure side to the low pressure side, a component of the acoustic radiation force in a direction from the outflow portion 13 toward the inflow portion 12 appears, and acts as a brake against the flow of the fluid. Accordingly, the velocity of the fine particles W from the inflow portion 12 toward the outflow portion 13 along the Z axis is reduced, and the fine particles W can be efficiently guided to the collecting unit 16.

In the accumulation portion 162 of the collecting unit 16, the flow of the fluid along the Z axis is extremely close to 0, and the standing wall 161 does not cause the flow of the fluid in a direction away from the Z axis. Therefore, inconvenience that the fine particles W accumulated in the accumulation portion 162 of the collecting unit 16 fly out from the collecting unit 16 can be prevented.

In the fluid device 10, the flow toward the outflow port 133, that is, the flow of the fluid from the Z axis toward the side wall side is generated in the vicinity of the outflow portion 13.

Here, when a resistance force $D_3$ against the flow of the fluid from the Z axis toward the side wall becomes larger than the acoustic radiation force $F_1$, the fine particles W which are not collected by the collecting unit 16 and flow out from the outflow port 133 increase.

In contrast, in the present embodiment, the standing wall 161 of the collecting unit 16 extends from the drive surface 143A toward the inflow portion 12 till the first position 161A. As described above, the first position 161A is a position at which the stress acting on the fine particles W toward the side wall is balanced with the stress toward the Z axis, that is, a position at which the resistance force $D_3$ against the flow of the fluid from the Z axis toward the side wall and the acoustic radiation force $F_1$ are balanced.

When the standing wall 161 is extended to the inflow portion 12 side beyond the first position 161A, the fine particles W which are moving in the outer peripheral region S2 and are not in the central axis region S1 may not be collected. Further, when the tip of the standing wall 161 is located closer to the drive surface 143A than the first position 161A, the resistance force $D_3$ is larger than the acoustic radiation force $F_1$, and the fine particles W guided to the central axis region S1 may move to the outer peripheral region S2 before being collected by the collecting unit 16. In contrast, by extending the standing wall 161 from the drive surface 143A till the first position 161A as described above, the fine particles W in the accumulation portion 162 of the collecting unit 16 can be efficiently accumulated.

The resistance force $D_3$ and the acoustic radiation force $F_1$ vary depending on an actual shape of the fine particles W. Therefore, the resistance force $D_3$ and the acoustic radiation force $F_1$ may be obtained by simulation, experiment, and the like for the fine particles W of a desired size collected by the collecting unit 16, and a position at which these forces are substantially balanced may be set as the first position.

Operation and Effect of Present Embodiment

The fluid device 10 according to the present embodiment includes the body portion 11, the drive plate 143, the standing wall 161, and the ultrasonic element 15. The body portion 11 includes the cylindrical first side wall 111 along the Z axis as a first axis and flows a fluid through a cylinder thereof from the inflow portion 12 provided at one side of the Z axis toward the outflow portion 13 provided at the other side of the Z axis. The drive plate 143 has the drive surface 143A as a first surface intersecting the Z axis. The standing wall 161 extends from the drive surface 143A toward the inflow portion 12 along the Z axis, and is formed in a cylindrical shape having a length along the Z axis shorter than the first side wall 111. The ultrasonic element 15 is disposed so as to surround an outside of the collection region A1 overlapping the standing wall 161 and the accumulation portion 162 surrounded by the standing wall 161 on the drive surface 143A, and transmits an ultrasonic wave along the Z axis.

Accordingly, in the fluid flowing into the fluid device 10 from the inflow portion 12 and flowing from the body portion 11 to the outflow portion 13 along the Z axis, the ultrasonic wave having a substantially cylindrical beam shape along the Z axis is transmitted to the outer peripheral region S2 around the central axis region S1. Therefore, an acoustic radiation pressure is applied to the fine particles W in the fluid in the outer peripheral region S2 by the ultrasonic wave. The fine particles W in the outer peripheral region S2 receive the acoustic radiation force $F_1$ toward the central axis region S1 and move toward the central axis region S1. Since the acoustic radiation pressure does not act on the central axis region S1, the fine particles W that moved to the central axis region S1 move to the accumulation portion 162 of the collecting unit 16 by the resistance force $D_2$ corresponding to a flow of the fluid flowing from the inflow portion 12 toward the outflow portion 13, and are accumulated in the accumulation portion 162. Therefore, by using the fluid device 10, the fluid and the fine particles W in the fluid can be separated from each other.

In such a fluid device 10 of the present embodiment, since the fine particles W are moved by utilizing the acoustic radiation pressure by the ultrasonic wave, a flow path width can be increased unlike a microfluidic chip using a standing wave in the related art. The fine particles W can be more rapidly removed from a large amount of fluids such as washing water from a washing machine.

Further, in the present embodiment, a waveform of the ultrasonic wave is distorted by increasing a sound pressure of the ultrasonic wave. Accordingly, a larger acoustic radiation force $F_1$ is obtained. That is, unlike the microfluidic chip in which the sound pressure of the ultrasonic wave is limited in the related art, the ultrasonic wave having a large sound pressure can be used. In this way, since the acoustic radiation force $F_1$ can be increased by increasing the sound pressure of the ultrasonic wave, the fine particles W can be collected in the collecting unit 16 with high efficiency from a large amount of fluids flowing through a wide flow path.

In the fluid device 10 according to the present embodiment, the inflow portion 12 includes the inflow port 124 through which the fluid flows into the fluid device 10 along a second axis ($X_1$ axis, $Y_1$ axis) intersecting the Z axis.

In such a configuration, the fine particles W in the fluid flowing in from the inflow portion 12 receive the resistance force $D_1$ due to the flow of the fluid. Therefore, since the fine particles W in the vicinity of the inflow portion 12 receive a drag force by the resistance force $D_1$ in addition to the acoustic radiation force $F_1$, the fine particles W can be more efficiently collected in the central axis region S1.

In the fluid device 10 according to the present embodiment, the outflow portion 13 includes the outflow port 133 through which the fluid flows out along a third axis ($X_2$ axis, $Y_2$ axis) intersecting the Z axis.

In this case, as compared to a case where the outflow port 133 is provided in the drive plate 143, an arrangement region of the ultrasonic element 15 disposed at the drive plate 143 can be ensured. Therefore, an ultrasonic wave having a large sound pressure can be transmitted from the ultrasonic element 15, the acoustic radiation force $F_1$ can be increased, and collection efficiency of the fine particles W can be improved.

In the fluid device 10 according to the present embodiment, the standing wall 161 extends from the drive surface 143A toward the inflow portion 12 till the first position 161A. The first position 161A is a position at which the resistance force $D_3$ for moving the fine particles W in a direction toward the side wall by the flow of the fluid and the acoustic radiation force $F_1$ of the ultrasonic wave are balanced.

Accordingly, the particles can be efficiently collected in the accumulation portion 162 inside the standing wall 161. That is, when a tip of the standing wall 161 is located closer to the inflow portion 12 than the first position 161A, an amount of the fine particles W that cannot move from the outer peripheral region S2 to the central axis region S1 and cannot enter the accumulation portion 162 due to being hindered by the standing wall 161 increases. Further, when the tip of the standing wall 161 is located closer to the drive surface 143A than the first position 161A, the fine particles W in the central axis region S1 may move to the outer peripheral region S2 due to the flow of the fluid toward the outflow port 133. In contrast, as described above, by setting the tip of the standing wall 161 to the first position, the fine particles W can be efficiently collected in the central axis region S1, and the inconvenience that the collected fine particles W move to the outer peripheral region S2 can be prevented, so that the collection efficiency of the fine particles W by the collecting unit 16 can be increased.

In the fluid device 10 according to the present embodiment, the ultrasonic element 15 is provided so as to cover a region other than the collection region A1 of the drive surface 143A.

Accordingly, a cylindrical ultrasonic beam can be formed along the Z axis in the fluid device 10, and the fine particles W can be collected in the central axis region S1.

In the fluid device 10 according to the present embodiment, the ultrasonic element 15 preferably transmits the ultrasonic wave as a non-standing wave along the Z axis.

When a standing wave is formed along the Z axis from the ultrasonic element 15, the fine particles W are collected at a position of a node of the standing wave, and moving efficiency of the fine particles W to the central axis region S1 decreases. In contrast, in the present embodiment, since the ultrasonic element 15 transmits the ultrasonic wave as the non-standing wave, the fine particles W can be efficiently collected to the central axis region S1 by the acoustic radiation force.

Modifications

The present disclosure is not limited to the embodiments described above, and configurations obtained through modifications, alterations, and appropriate combinations of the embodiments within a scope of being capable of achieving the object of the present disclosure are included in the present disclosure.

First Modification

The above-described embodiment describes a configuration in which the inflow portion 12 includes the inflow-side lid portion 123. Alternatively, the inflow-side lid portion 123 may not be provided. For example, an end surface of a fluid device at an inflow portion 12 side may be open.

Second Modification

The above-described embodiment describes a configuration in which the ultrasonic element 15 is provided at the drive plate 143 of the outflow portion 13. Alternatively, the ultrasonic element 15 may be provided at the inflow portion 12.

For example, the ultrasonic element 15 may be disposed at the inflow-side lid portion 123, and the ultrasonic wave may be transmitted from the inflow portion 12 side to the outflow portion 13 side along the Z axis. In this case, a braking effect of the fine particles W by the ultrasonic wave cannot be obtained, but by slowing down the flow velocity of the fluid, inconvenience that the fine particles W are discharged from the outflow port 133 before moving to the central axis region S1 can be prevented.

Third Modification

The above-described embodiment describes an example in which the ultrasonic element 15 is disposed so as to cover an entire region of the drive surface 143A that does not overlap the collecting unit 16 with respect to the drive plate 143, whereas the present disclosure is not limited thereto.

In the above-described embodiment, the standing wall 161 penetrates the drive plate 143 and is coupled to the collecting mechanism 163 in the collecting unit 16. Alternatively, in a configuration in which the collection unit 16 is detachably fixed to the drive plate 143 by the collection mechanism 163, for example, the ultrasonic element 15 may be disposed so as to cover the entire drive surface 143A of the drive plate 143.

In this case, among a plurality of ultrasonic transducers Tr constituting the ultrasonic element 15, the ultrasonic transducer Tr disposed at a position overlapping the collecting unit 16 may be set to be non-driven.

Further, as an arrangement of the ultrasonic element 15, the ultrasonic element 15 may not cover the entire surrounding region A2 other than the collection region A1 overlapping the collecting unit 16 of the drive surface 143A. For example, a plurality of ultrasonic elements 15 may be disposed at equal intervals around the collecting unit 16 in the surrounding region A2.

Further, as the arrangement of the ultrasonic element 15, a plurality of ultrasonic elements 15 may be disposed at unequal intervals around the collecting unit 16 in the surrounding region A2. For example, a plurality of ultrasonic elements 15 may be disposed such that element intervals of the plurality of ultrasonic elements 15 become narrower toward an outer periphery of the drive plate 143 around the collecting unit 16 in the surrounding region A2.

Fourth Modification

The above-described embodiment describes a configuration in which in the inflow portion 12, the inflow port 124 is coupled to the second side wall 122, and a fluid flows in from a second axis ($X_1$ axis, $Y_1$ axis) orthogonal to a Z axis, whereas the present disclosure is not limited thereto.

For example, the inflow port 124 may be provided at the inflow-side lid portion 123. Alternatively, when the inflow-side lid portion 123 is not provided as in the first modification, a coupling pipe coupled to the water treatment unit 2 may be directly coupled to a side of the second side wall 122 opposite to the body portion 11.

The same applies to the outflow port 133, and the above-described embodiment describes the example in which the outflow port 133 is coupled to the third side wall 132, whereas the present disclosure is not limited thereto.

For example, when the ultrasonic element 15 is provided at the inflow portion 12 side as in the first modification, the outflow port 133 may be coupled to the drive plate 143. Alternatively, when a plurality of ultrasonic elements 15 are disposed with gaps therebetween as in the third modification, the outflow port 133 may be provided between adjacent ultrasonic elements 15.

Fifth Modification

The above-described embodiment shows the inflow portion 12 at an upper side of the drawing and the outflow portion 13 at a lower side of the drawing in FIGS. 1, 2, 5, 7, 9, and 12, whereas this does not mean that an up-and-down direction in the drawing is a vertical direction. A Z axis direction in a fluid device is not limited to the vertical direction, and the fluid device can be installed in any direction. For example, a direction from the inflow portion 12 to the outflow portion 13 may be a direction from a lower side to an upper side in the vertical direction, or may be a horizontal direction orthogonal to the vertical direction.

Overview of Present Disclosure

A fluid device according to a first aspect of the present disclosure includes: a flow main body including a cylindrical side wall along a first axis and configured to flow a fluid through a cylindrical inside thereof from an inflow portion provided at one side of the first axis toward an outflow portion provided at the other side of the first axis; a plate provided at the other side of the first axis of the flow main body and having a first surface intersecting the first axis; a cylindrical standing wall extending from the first surface toward the one side of the first axis and having a length along the first axis shorter than the side wall; and an ultrasonic element disposed at an outer side of a collection region of the plate and configured to transmit an ultrasonic wave along the first axis when the standing wall and a region surrounded by the standing wall on the first surface are defined as the collection region.

In the present aspect, in the fluid flowing into the fluid device from the inflow portion and flowing from the flow main body to the outflow portion along the first axis, an ultrasonic wave having a substantially cylindrical beam shape along the first axis is transmitted to an outer peripheral region around a central axis region centered on the first axis. Accordingly, an acoustic radiation force toward the central axis region can be applied to fine particles in the fluid in the outer peripheral region. Further, the fine particles that moved to the central axis region can be moved to a region surrounded by the standing wall by a resistance force corresponding to a flow of the fluid flowing from the inflow portion toward the outflow portion. Accordingly, the fluid and the fine particles in the fluid can be separated from each other.

Then, in the fluid device of the present aspect, since the fine particles are moved by utilizing the acoustic radiation pressure by the ultrasonic wave, a flow path width can be increased unlike a microfluidic chip using a standing wave in the related art, and the fine particles can be more rapidly removed from a large amount of fluids.

Further, in the microfluidic chip in the related art, since it is necessary to form a standing wave, the sound pressure of the ultrasonic wave is limited, whereas in the fluid device of the present aspect, by increasing the sound pressure of the ultrasonic wave, the acoustic radiation force can be increased, and the fine particles can be collected with high efficiency from a large amount of fluids flowing through a wide flow path.

In the fluid device of the present aspect, the inflow portion may include an inflow port through which the fluid flows into the flow main body from a second axis intersecting the first axis.

In such a configuration, the fine particles in the fluid flowing in from the inflow port receive a resistance force toward the first axis due to the flow of the fluid. Therefore, the fine particles in the fluid in the vicinity of the inflow portion can be moved toward the first axis by a resultant force of both the acoustic radiation force and the resistance force, and the fine particles can be more efficiently collected to the first axis.

In the fluid device of the present aspect, the outflow portion may include an outflow port through which the fluid flows out along a third axis intersecting the first axis.

Accordingly, an arrangement area of the ultrasonic element disposed at the plate can be increased, the sound pressure of the ultrasonic wave can be increased, the acoustic radiation force acting on the fine particles can be increased by the increase in the sound pressure of the ultrasonic wave, and collection efficiency of the fine particles can be increased.

In the fluid device of the present aspect, the standing wall may extend from the first surface toward the one side of the first axis till a first position, and the first position may be a position at which a stress for moving fine particles in the fluid toward the side wall along a direction intersecting the first axis due to a flow of the fluid and an acoustic radiation force due to the ultrasonic wave are balanced.

Accordingly, the fine particles in the fluid can be efficiently collected in the central axis region centered on the first axis, and inconvenience that the collected fine particles move from the central axis region to the side wall side can be prevented.

In the fluid device of the present aspect, the ultrasonic element may be provided to cover a region other than the collection region of the first surface.

Accordingly, a cylindrical ultrasonic beam can be formed along the first axis in the body portion 11, and the fine particles can be collected in the central axis region centered on the first axis as a center of the cylinder.

In the fluid device of the present aspect, the ultrasonic element may transmit the ultrasonic wave as a non-standing wave along the first axis.

When the ultrasonic wave transmitted by the ultrasonic element is a standing wave, the fine particles are collected at a position, and moving efficiency of the fine particles to the central axis region decreases. In contrast, when the ultrasonic wave is a non-standing wave, the fine particles can be efficiently collected in the central axis region by the acoustic radiation force.

A fluid device according to a second aspect of the present disclosure includes: a flow main body including a cylindrical side wall along a first axis and configured to flow a fluid through an inside of the cylinder from an inflow portion provided at one side of the first axis toward an outflow portion provided at the other side of the first axis; a cylindrical standing wall provided at the other side of the first axis of the flow main body, having an axial direction along the first axis, extending along the first axis, and having a length along the first axis shorter than the side wall; and an ultrasonic element configured to transmit a beam-shaped ultrasonic wave surrounding the standing wall along the first axis between the standing wall and the side wall when viewed along the first axis.

In the present aspect, similar to the first aspect described above, since the ultrasonic wave having a substantially cylindrical beam shape along the first axis is transmitted to the outer peripheral region around the central axis region centered on the first axis, the fine particles in the outer peripheral region can be moved to the central axis region by the acoustic radiation force and collected in the region surrounded by the standing wall, and the fluid and the fine particles can be separated from each other.

Similar to the first aspect, also in the present aspect, since the flow path width as an inner diameter of the cylindrical side wall can be increased, the fine particles can be more rapidly removed from a large amount of fluids as compared to the microfluidic chip in the related art. Further, since the acoustic radiation force can be increased by increasing the sound pressure of the ultrasonic wave, the fine particles can be efficiently separated from the large amount of fluids.

What is claimed is:

1. A fluid device comprising:
a flow main body including a side wall along a first axis and configured to flow a fluid from an inflow portion provided at a first side of the first axis toward an outflow portion provided at a second side of the first axis, wherein the second side is opposite to the first side;
a plate provided at the second side of the first axis of the flow main body and having a first surface intersecting the first axis;
a standing wall extending from the first surface toward the first side of the first axis and having a length along the first axis shorter than the side wall; and
an ultrasonic element disposed at an outer side of a collection region of the plate and configured to transmit an ultrasonic wave along the first axis when the standing wall and a region surrounded by the standing wall on the first surface are defined as the collection region.

2. The fluid device according to claim 1, wherein the inflow portion includes an inflow port through which the fluid flows into the flow main body from a second axis intersecting the first axis.

3. The fluid device according to claim 2, wherein the ultrasonic element is provided to cover a region other than the collection region of the first surface.

4. The fluid device according to claim 3, wherein the ultrasonic element transmits the ultrasonic wave as a non-standing wave along the first axis.

5. The fluid device according to claim 2, wherein the ultrasonic element transmits the ultrasonic wave as a non-standing wave along the first axis.

6. The fluid device according to claim 1, wherein the outflow portion includes an outflow port through which the fluid flows out along a third axis intersecting the first axis.

7. The fluid device according to claim 6, wherein
the standing wall extends from the first surface toward the first side of the first axis till a first position, and
the first position is a position at which a stress for moving fine particles in the fluid toward the side wall along a direction intersecting the first axis due to a flow of the fluid and an acoustic radiation force due to the ultrasonic wave are balanced.

8. The fluid device according to claim 7, wherein the ultrasonic element is provided to cover a region other than the collection region of the first surface.

9. The fluid device according to claim 8, wherein the ultrasonic element transmits the ultrasonic wave as a non-standing wave along the first axis.

10. The fluid device according to claim 7, wherein the ultrasonic element transmits the ultrasonic wave as a non-standing wave along the first axis.

11. The fluid device according to claim 6, wherein the ultrasonic element is provided to cover a region other than the collection region of the first surface.

12. The fluid device according to claim 11, wherein the ultrasonic element transmits the ultrasonic wave as a non-standing wave along the first axis.

13. The fluid device according to claim 6, wherein the ultrasonic element transmits the ultrasonic wave as a non-standing wave along the first axis.

14. The fluid device according to claim 1, wherein the ultrasonic element is provided to cover a region other than the collection region of the first surface.

15. The fluid device according to claim 14, wherein the ultrasonic element transmits the ultrasonic wave as a non-standing wave along the first axis.

16. The fluid device according to claim 1, wherein the ultrasonic element transmits the ultrasonic wave as a non-standing wave along the first axis.

17. A fluid device comprising:
a flow main body including a side wall along a first axis and configured to flow a fluid from an inflow portion provided at a first side of the first axis toward an outflow portion provided at a second side of the first axis, wherein the second side is opposite to the first side;
a standing wall provided at the second side of the first axis of the flow main body, having an axial direction along the first axis, extending along the first axis, and having a length along the first axis shorter than the side wall; and
an ultrasonic element configured to transmit a beam-shaped ultrasonic wave surrounding the standing wall along the first axis between the standing wall and the side wall when viewed along the first axis.

* * * * *